(12) United States Patent
Jyono et al.

(10) Patent No.: US 6,444,775 B1
(45) Date of Patent: Sep. 3, 2002

(54) CURABLE COMPOSITION

(75) Inventors: Hideharu Jyono, Kobe; Hidetoshi Odaka; Hiroshi Ito, both of Takasago; Hiroshi Iwakiri, Kobe, all of (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/534,990

(22) Filed: Mar. 27, 2000

(30) Foreign Application Priority Data

Mar. 25, 1999 (JP) .............................................. 11-081963

(51) Int. Cl.$^7$ ........................ C08G 77/00; C08G 77/60
(52) U.S. Cl. ............................ 528/23; 524/742; 528/15; 528/17; 528/18; 528/21; 528/25; 528/31; 528/35; 528/901
(58) Field of Search ............................ 528/901, 17, 18, 528/15, 21, 26, 31, 23, 25, 35; 524/742

(56) References Cited

U.S. PATENT DOCUMENTS

| | | | |
|---|---|---|---|
| 4,242,466 A | * | 12/1980 | Schilling, Jr. et al. |
| 4,323,488 A | * | 4/1982 | Takago et al. |
| 4,578,497 A | * | 3/1986 | Onopchenko et al. |
| 4,927,949 A | * | 5/1990 | Kabeta et al. |
| 5,500,464 A | * | 3/1996 | Homma et al. |

FOREIGN PATENT DOCUMENTS

| | | |
|---|---|---|
| EP | 0 829 504 A1 | 3/1998 |
| EP | 0 844 266 A2 | 5/1998 |
| EP | 1 018 530 A2 | 7/2000 |
| EP | 1 036 807 A2 | 9/2000 |
| JP | 5-125272 | 5/1993 |
| JP | 09296046 | 11/1997 |
| WO | WO 91/13928 | 3/1990 |

OTHER PUBLICATIONS

"Contemporary Polymer Chemistry, 2nd edition", Allcock et al., Prentice Hall Inc., 1990, p. 2.*

* cited by examiner

Primary Examiner—Robert Dawson
Assistant Examiner—Marc S. Zimmer
(74) Attorney, Agent, or Firm—Connolly Bove Lodge & Hutz LLP

(57) ABSTRACT

The present invention has its object to provide a curable composition showing a controlled initial curing rate and, hence, offering good workability by introducing a methyl group into the neighborhood of the reactive silicon group within an oligomer to indirectly lower the reactivity of the reactive silicon group within the oligomer. The present invention is concerned with a curable composition comprising (A) a reactive silicon group-containing polyether oligomer and (B) a silanol condensation catalyst, said (A) reactive silicon group-containing polyether oligomer having a partial structure of the following general formula (1) per molecule:

$$\text{—O—R}^1\text{—CH(CH}_3)\text{—CH}_2\text{—(Si(R}^2{}_{2-b})(X_b)\text{O)}_m\text{Si(R}^3{}_{3-a})X_a \quad (1)$$

8 Claims, No Drawings

CURABLE COMPOSITION

TECHNICAL FIELD

The present invention relates to a curable composition comprising a reactive silicon group-containing polyether oligomer and a silanol condensation catalyst.

BACKGROUND ART

The room temperature curing composition comprising a reactive silicon group-containing polyether oligomer and a silanol condensation catalyst is known and has been used in the field of sealants, adhesives and so on.

In WO 91/13928, there is disclosed a curable composition comprising a reactive silicon group-containing oxypropylene polymer, a tin(II) organocarboxylate and an organic amine, which is intended for improving reversion characteristic of a cured product.

Japanese Kokai Publication Hei-5-125272 discloses a curable composition comprising a reactive silicon group-containing oxypropylene polymer and an organotin (IV) compound, which is designed for increasing curing rate.

The room temperature curing composition cures as it encounters moisture in the air and if the curing rate is too high, the curing reaction proceeds fast enough in the course of field work to interfere with workability. For improvement in workability, control of the curing rate is important and this control has heretofore been made by changing the catalyst species, increasing or decreasing the amount of the catalyst and/or modifying the terminal reactive silicon group.

However, when the curing rate is lowered by such procedures for improving workability, an excessive reduction in the curing rate results in unsatisfactory curing, such as poor curability and deteriorations in physical properties of the cured product. Thus, workability and curability could hardly be reconciled and adjustment of the curing rate for striking a balance between both properties has so far been made only on a trial-and-error basis.

SUMMARY OF THE INVENTION

The object of the present invention is to provide a curable composition showing a controlled initial curing rate and, hence, offering good workability by introducing a methyl group into the neighborhood of the reactive silicon group within an oligomer to indirectly lower the reactivity of the reactive silicon group within the oligomer.

Thus, the first aspect of the present invention is concerned with a curable composition comprising (A) a reactive silicon group-containing polyether oligomer and (B) a silanol condensation catalyst, said (A) reactive silicon group-containing polyether oligomer having a partial structure of the following general formula (1) per molecule:

$$-O-R^1-CH(CH_3)-CH_2-(Si(R^2{}_{2-b})(X_b)O)_m Si(R^3{}_{3-a})X_a \quad (1)$$

wherein $R^1$ represents a divalent organic group containing 1 to 20 carbon atoms and one or more constituent atoms selected from the group consisting of hydrogen, oxygen and nitrogen; $R^2$ and $R^3$ may be the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO-$; when 2 or more $R^2$ or $R^3$ groups are present, they may be the same or different; R' represents a monovalent hydrocarbon group containing 1 to 20 carbon atoms and three R' groups may be the same or different; X represents a hydroxyl group or a hydrolyzable group and when two or more X groups are present, they may be the same or different; a represents 0, 1, 2 or 3; b represents 0, 1 or 2; b may be the same or different over m repeats of $(Si(R^2{}_{2-b})(X_b)O)$; m represents an integer of 0 to 19; provided, however, that the relation of $a+\Sigma b \geq 1$ is satisfied.

The preferred embodiment is the above curable composition wherein $R^1$ in (A) represents $CH_2$.

Another preferred embodiment is the above-mentioned curable composition
wherein said (A) reactive silicon group-containing polyether oligomer has a partial structure of the following formula per molecule:

$$-O-CH_2-CH(CH_3)-CH_2-Si(CH_3)(OCH_3)_2$$

A still another preferred embodiment is the above-mentioned curable composition
wherein said (A) reactive silicon group-containing polyether oligomer is obtainable by reacting a polyether oligomer having an unsaturated bond of the following general formula (2):

$$-O-R^1-C(CH_3)=CH_2 \quad (2)$$

$R^1$ is as defined above,
with a reactive silicon group-containing compound represented by the following general formula (3):

$$H-(Si(R^2{}_{2-b})(X_b)O)_m Si(R^3{}_{3-a})X_a \quad (3)$$

$R^2$, $R^3$, a, b, m and X are as defined above,
in the presence of a catalyst and a sulfur compound in an oxygen-containing atmosphere.

A still another preferred embodiment is the above-mentioned curable composition
wherein said (A) reactive silicon group-containing polyether oligomer has a partial structure of the following formula:

$$-O-CH_2-CH(CH_3)-CH_2-Si(CH_3)(OCH_3)_2$$

said (A) being obtainable by reacting a polyether oligomer having an unsaturated bond of the following formula:

$$-O-CH_2-C(CH_3)=CH_2$$

with a reactive silicon group-containing compound represented by the following formula:

$$H-Si(CH_3)(OCH_3)_2$$

in the presence of a catalyst and a sulfur compound in an oxygen-containing atmosphere.

A further preferred embodiment is the above-mentioned curable composition
wherein, in the reactive silicon group-containing polyether oligomer, the number of reactive silicon groups is not less than 85% of the number of molecular chain terminals.

DETAILED DESCRIPTION OF THE INVENTION

The present invention is now described in detail. The reactive silicon group-containing polyether oligomer for use as the component (A) in the present invention may be any polyether oligomer having a polyether main chain and, in a side chain thereof or in a terminal position thereof, at least one partial structure of the following general formula (1):

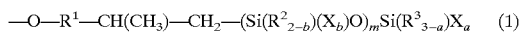

wherein $R^1$ represents a divalent organic group containing 1 to 20 carbon atoms and one or more constituent atoms selected from the group consisting of hydrogen, oxygen and nitrogen; $R^2$ and $R^3$ may be the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO—$; when 2 or more $R^2$ or $R^3$ groups are present, they may be the same or different; R' represents a monovalent hydrocarbon group containing 1 to 20 carbon atoms and three R' groups may be the same or different; X represents a hydroxyl group or a hydrolyzable group and when two or more X groups are present, they may be the same or different; a represents 0, 1, 2 or 3; b represents 0, 1 or 2; b may be the same or different over m repeats of $(Si(R^2_{2-b})(X_b)O)$; m represents an integer of 0 to 19; provided, however, that the relation of $a+\Sigma b \geq 1$ is satisfied.

The reactive silicon group-containing oligomer heretofore in use has a reactive silicon group bound to an oligomer main chain through a straight-chain alkyleneoxy group such as $—O—CH_2—CH_2—CH_2—$ and, as such, tends to be too rapid in curing to provide for sufficient workability. In the present invention, the reactive silicon group is bound to the oligomer main chain through $—O—R^1—CH(CH_3)—CH_2—$, a group having a side-chain methyl group. By providing a methyl side-chain in this manner, the curing rate can be controlled to provide a curable composition of improved workability.

$R^1$ represents a divalent organic group containing 1 to 20 carbon atoms and one or more constituent atoms of the group consisting of hydrogen, oxygen and nitrogen. As said divalent organic group, there can be mentioned $—CH_2—$, $—C_2H_4—$, $—C_3H_6—$, $—C_4H_8—$, $—C_5H_{10}—$, $—C_6H_4—$, $—C_6H_{12}—$, $—C_7H_{14}—$, $—C_8H_{16}—$, $—C_9H_{18}—$, $—C_{10}H_{20}—$, $—CH(CH_3)—$, $—CH_2—CH(CH_3)—$, $—CH_2—CH(CH_3)—CH_2—$, $—C_2H_4—CH(CH_3)—$, $—CH_2—C_6H_4—$, $—CH_2—C_6H_4—CH_2—$, $—C_2H_4—C_6H_4—$, $—C(O)—$, $—C(O)—CH_2—$, $—C(O)—C_6H_4—$, $—C(O)—NH—$, $—C(O)—NH—CH_2—$, $—C(O)—NH—C_6H_4—$, $—C(O)—O—$, $—C(O)—O—CH_2—$, and $—C(O)—O—C_6H_4—$. Among these, $—CH_2—$, $—C_2H_4—$, $—CH_2—CH(CH_3)—$, $—C(O)—$, and $—C(O)—NH—$ are preferred in view of the ease of synthesis. From the availability of the starting material, $—CH_2—$ is particularly preferred.

$R^2$ and $R^3$ include alkyl groups such as methyl, ethyl, etc.; cycloalkyl groups such as cyclohexyl etc.; aryl groups such as phenyl etc.; aralkyl groups such as benzyl etc.; and trioganosiloxy groups of the formula $(R')_3SiO—$ where R' may for example be methyl or phenyl. Among them, methyl is particularly preferred for $R^2$, $R^3$ and R'.

The reactive silicon group in the reactive silicon group-containing polyether oligomer of general formula (1) includes groups of the general formula (4):

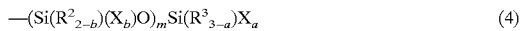

wherein $R^2$ and $R^3$ may be the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO—$; when 2 or more $R^2$ or $R^3$ groups are present, they may be the same or different; R' represents a monovalent hydrocarbon group containing 1 to 20 carbon atoms and three R' groups may be the same or different; X represents a hydroxyl group or a hydrolyzable group and when two or more X groups are present, they may be the same or different; a represents 0, 1, 2 or 3; b represents 0, 1 or 2; b may be the same or different over m repeats of $(Si(R^2_{2-b})(X_b)O)$; m represents an integer of 0 to 19; provided, however, that the relation of $a+\Sigma b \geq 1$ is satisfied.

The reactive silicon group in the context of the present invention is capable of forming a siloxane bond on intermolecular condensation.

Referring to X, the hydrolyzable group is not particularly restricted but includes various known hydrolyzable groups. As specific examples, there can be mentioned hydrogen, halogen, alkoxy, acyloxy, ketoximato, amino, amido, acid amino, aminooxy, mercapto, and alkenyloxy, among others. In view of hydrolyzability under mild conditions and ease of handling, alkoxy groups such as methoxy, ethoxy, propoxy, isopropoxy, etc. are preferred among them.

The hydroxyl group and/or hydrolyzable group may be attached, in the number of 1 to 3, to one silicon atom and $(a+\Sigma b)$ is preferably 1 to 5. When two or more hydroxyl or hydrolyzable groups are present in the reactive silicon group, they may be the same or different.

The number of silicon atoms in the reactive silicon group may be only one or more than 1, and may be about 20 when silicon atoms are joined in the manner of siloxane bonding, for instance.

Preferred, in view of the ease of availability, is a reactive silicon (silyl) group of the following general formula (5):

$$—Si(R^3_{3-a})X_a \qquad (5)$$

wherein $R^3$, X and a are as defined above.

The average number of reactive silicon groups per molecular chain terminal in the polyether oligomer is preferably at least 0.1 and, from curability points of view, is preferably 0.5 to 5. The more preferred number is 0.8 to 2. From the standpoint of providing a cured product showing satisfactory rubber-like elastic properties, the reactive silicon group preferably exists in the average number of 0.9 to 1.

More particularly, the reactive silicon group-containing polyether oligomer (A) preferably has a partial structure of the following formula per molecule.

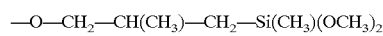

The molecular weight of the polyether oligomer (A) in the present invention is not particularly restricted but is preferably 1,000 to 100,000 in terms of number average molecular weight. When the number average molecular weight is less than 1,000, the reactive silicon group-containing polyether oligomer will give a fragile product on curing. When the number average molecular weight exceeds 100,000, the functional group concentration will become so low that the curing rate will be decreased. Moreover, the viscosity of the oligomer will become too high to be handled with ease. From the standpoint of viscosity of the reactive silicon group-containing oligomer obtained, the number average molecular weight is more preferably within the range of 5,000 to 50,000.

The number average molecular weight of the polyether oligomer as so referred to herein is defined as the number average molecular weight determined by directly measuring the terminal group concentration by titration based on the principles of the hydroxy value determination method according to JIS K 1557 and the iodine value determination method according to JIS K 0070 and taking the structure of the polyether oligomer into consideration. It is also possible to determine the number average molecular weight by a relative measurement method which comprises constructing a working curve for the polystyrene converted molecular weight determined by general GPC measurement and the above terminal group-based molecular weight and making the conversion from GPC-based molecular weight to terminal group-based molecular weight.

The main chain structure of the polyether oligomer (A) need only be a polymer structure comprising an —R—O— structure as a repeating unit, where R may be any divalent organic group containing 1 to 20 carbon atoms and one or more constituent atoms selected from the group consisting of hydrogen, oxygen and nitrogen. It may also be a homopolymer which is exclusively composed of the same repeating unit or a copolymer comprising two or more kinds of repeating units. Furthermore, the main chain structure may be branched. The component (A) according to the present invention may be a hydroxyl group-containing polyether obtainable by, for example, the following various methods.

For preparing the component (A) of the present invention, a polyether can be used, which is obtainable by subjecting a substituted or unsubstituted epoxy compound having 2 to 12 carbon atoms and, as an initiator, a dihydric or polyhydric alcohol or a hydroxyl-containing oligomer to ring-opening polymerization in the presence of a catalyst, said epoxy compound being, for example, an alkylene oxide, e.g. ethylene oxide, propylene oxide, α-butylene oxide, β-butylene oxide, hexene oxide, cyclohexene oxide, styrene oxide, α-methylstyrene oxide, etc., or an alkyl, allyl or aryl glycidyl ether, e.g. methyl glycidyl ether, ethyl glycidyl ether, isopropyl glycidyl ether, butyl glycidyl ether, allyl glycidyl ether, phenyl glycidyl ether, etc., said dihydric or polyhydric alcohol being, for example, ethylene glycol, propylene glycol, butanediol, hexamethylene glycol, methallyl alcohol, hydrogenated bisphenol A, neopentyl glycol, polybutadienediol, diethylene glycol, triethylene glycol, polyethylene glycol, polypropylene glycol, polypropylenetriol, polypropylenetetraol, dipropylene glycol, glycerol, trimethylolmethane, trimethylolpropane, pentaerythritol, etc. The catalyst used for this polymerization reaction includes various known catalysts, such as alkaline catalysts, e.g. KOH, NaOH, etc.; acidic catalysts such as trifluoroborane-etherate; or aluminoporphyrin metal complexes, double metal cyanide complex catalysts such as cobalt zinc cyanide-glyme complexes. Particularly preferred is a double metal cyanide complex catalyst less liable to involve side reactions, although it is not an exclusive choice.

Production of component (A) from a hydroxyl group-containing polyether oligomer can be carried out by the known method, for example by the process which comprises introducing an unsaturated bond into the hydroxyl group-containing polyether oligomer and reacting the same with a reactive silicon group-containing compound.

The method of introducing an unsaturated bond into the hydroxyl group-containing polyether oligomer may for example be the method via ether bonding, ester bonding, urethane bonding, or carbonate bonding. For the introduction of an unsaturated group by ether bonding, for instance, the hydroxyl group of the polyether oligomer is first metaloxylated to —OM, where M is Na or K, and the oligomer is then reacted with an organohalogen compound of the general formula (6) to give an unsaturated group-containing polyether.

$$H_2C=C(CH_3)-R-Y \quad (6)$$

wherein $R^1$ represents a divalent organic group containing 1 to 20 carbon atoms and at least one member selected from the group consisting of hydrogen, oxygen and nitrogen; Y represents halogen.

As a process for reacting the unsaturated bond-introduced polyether oligomer with the reactive silicon group-containing compound, there can be mentioned a hydrosilylation reaction in the presence of a catalyst. To promote the reaction, this hydrosilylation reaction is preferably carried out in an oxygen-containing atmosphere and in the presence of an additive such as a sulfur compound.

The reactive silicon group-containing compound for use in this hydrosilylation reaction need only contain at least one silicon group bound to said hydroxyl or hydrolyzable group within its molecule and at least one Si—H group per molecule. As representative examples, compounds of the following general formula (3) can be mentioned:

$$H-(Si(R^2{}_{2-b})(X_b)O)_m Si(R^3{}_{3-a})X_a \quad (3)$$

wherein $R^2$, $R^3$, a, b, m and X are respectively the same as defined in general formula (1).

More particularly, there can be mentioned halogenated silanes such as trichlorosilane, methyldichlorosilane, dimethylchlorosilane, phenyldichlorosilane, trimethylsiloxymethylchlorosilane, 1,1,3,3-tetramethyl-1-bromodisiloxane, etc.; alkoxysilanes such as trimethoxysilane, triethoxysilane, methyldiethoxysilane, methyldimethoxysilane, phenyldimethoxysilane, trimethylsiloxymethylmethoxysilane, trimethylsiloxydiethoxysilane, etc.; acyloxysilanes such as methyldiacetoxysilane, phenyldiacetoxysilane, triacetoxysilane, trimethylsiloxymethylacetoxysilane, trimethylsiloxydiacetoxysilane, etc.; ketoximatosilanes such as bis(dimethylketoximato)methylsilane, bis(cyclohexylketoximato)methylsilane, bis(diethylketoximato)trimethylsiloxysilane, bis(methylethylketoximato)methylsilane, tris(acetoximato)silane, etc.; and alkenyloxysilanes such as methylisopropenyloxysilane, etc. Among these, alkoxysilanes are preferred, with methoxy being particularly preferred.

From availability points of view, reactive silicon groups of the following general formula (7) are preferred, $$H-Si(R^3{}_{3-a})X_a \quad (7)$$

wherein $R^3$, X and a are as defined hereinbefore.

Referring to general formulas (3) and (7), $R^2$ and $R^3$ each may for example be an alkyl group, e.g. methyl or ethyl; a cycloalkyl group, e.g. cyclohexyl; an aryl group, e.g. phenyl; an aralkyl group, e.g. benzyl, or a triorganosiloxy group of the formula $(R')_3SiO-$ where R' may for example be methyl or phenyl. For $R^2$, $R^3$ and R', methyl is particularly preferred.

Referring to said hydrosilylation reaction, preferred is the reactive silicon group-containing polyether oligomer containing the reactive silicon group obtainable by reacting a polyether oligomer containing the unsaturated bond of general formula (2):

$$-O-R^1-C(CH_3)=CH_2 \quad (2)$$

$R_1$ is as defined hereinbefore, with a reactive silicon group-containing compound represented by general formula (3):

$$H-(Si(R^2{}_{2-b})(X_b)O)_m Si(R^3{}_{3-a})X_a \quad (3)$$

$R^2$, $R^3$, a, b, m and X are as defined in general formula (1), in the presence of a catalyst and a sulfur compound in an oxygen-containing atmosphere, and more preferred is the reactive silicon group-containing polyether oligomer having a partial structure of the following structure:

—O—CH$_2$—CH(CH$_3$)—CH$_2$—Si(CH$_3$)(OCH$_3$)$_2$ said (A) being obtainable by reacting a polyether oligomer containing an unsaturated bond of the following formula:

—O—CH$_2$—C(CH$_3$)=CH$_2$ with a reactive silicon group-containing compound represented by the formula:

H—Si(CH$_3$)(OCH$_3$)$_2$ in the presence of a catalyst and a sulfur compound in an oxygen-containing atmosphere.

Furthermore, in the present invention, the hydrolyzable group X in the silyl group obtained can be converted to a different hydrolyzable group. Particularly when X is a halogen atom, a hydrogen halide with an intense irritating odor is emanated in moisture-curing and, therefore, X is preferably converted to a different type of hydrolyzable group. The hydrolyzable functional group to which this conversion can be made includes alkoxy, acyloxy, ketoximato, amido, acid amino, aminooxy and mercapto, among others. A variety of methods can be utilized for conversion of a halogen functional group to such a different type of hydrolyzable group. The method for conversion to an alkoxy group, for instance, includes a process which comprises reacting the halogen functional group with (1) an alcohol or phenol, e.g. methanol, ethanol, 2-methoxyethanol, sec-butanol, tert-butanol, phenol, etc., (2) an alkoxide, e.g. an alcoholate or phenolate of sodium, potassium or lithium, (3) an ortho-formate, e.g. methyl ortho-formate, ethyl ortho-formate, etc., or (4) an epoxy compound such as ethylene oxide, propylene oxide, allyl glycidyl ether, etc. Particularly, this conversion reaction can be easily carried out with satisfactory results by using the combination of (1) with (3), namely an alcohol or a phenol with an ortho-formate, or the combination of (1) with (4), namely an alcohol or a phenol with an epoxy compound. The method for conversion to an acyloxy group includes a process which comprises reacting the halogen functional group with (1) a carboxylic acid, e.g. acetic acid or propionic acid, (2) an acid anhydride, e.g. acetic anhydride, or (3) the sodium, potassium or lithium salt of a carboxylic acid. Similarly, the method for conversion to an aminooxy group includes a process which comprises reacting the halogen functional group with (1) a hydroxylamine, e.g. N,N-dimethylhydroxylamine, N,N-diethylhydroxylamine, N,N-methylphenylhydroxylamine or N-hydroxypyrrolidine, or (2) the sodium, potassium or lithium salt of a hydroxylamine. The method for conversion to an amido group includes a process in which comprises reacting the halogen functional group with (1) a primary or secondary amine, e.g. N,N-dimethylamine, N,N-diethylamine, N-methylphenylamine or pyrrolidine, or (2) the sodium, potassium or lithium salt of a primary or secondary amine. The method for conversion to an acid amino group includes a process which comprises reacting the halogen functional group with (1) an acid amide having at least one hydrogen atom on the nitrogen atom, e.g. acetamide, formamide or propionamide or (2) the sodium, potassium or lithium salt of such an acid amide. When a combination of a ketoxime, e.g. acetoxime or methyl ethyl ketoxime, or a mercaptan, e.g. N-octylmercaptan or t-butylmercaptan, is used in combination with an ortho-formate or an epoxy compound, some of the available halogen functional groups can be converted to ketoximato or mercapto groups, with the others being converted to the alkoxy groups derived from the ortho-formate or epoxy compound used. It is not that only halogen functional groups can be converted to other kinds of hydrolyzable groups but various kinds of hydrolyzable groups can be converted to different hydrolyzable groups.

The hydrosilylation reaction in the production process according to the present invention is preferably carried out generally at 10 to 200° C., preferably at 20 to 150° C., and more preferably within the temperature range of 40 to 120° C. Depending on the need for controlling the reaction temperature or the viscosity of the reaction system, a solvent such as benzene, toluene, xylene, tetrahydrofuran, methylene chloride, pentane, hexane or heptane can be used.

The catalyst which can be used with advantage in the reaction of the unsaturated bond-introduced polyether oligomer with the reactive silicon group-containing compound includes metal complex catalysts of metals selected from among Group VIII transition metal elements such as platinum, rhodium, cobalt, palladium and nickel. For example, such compounds as H$_2$PtCl$_6$·6H$_2$O, platinum-vinylsiloxane complexes, platinum-olefin complexes, Pt metal, RhCl(PPh$_3$)$_3$, RhCl$_3$, Rh/Al$_2$O$_3$, RuCl$_3$, IrCl$_3$, FeCl$_3$, AlCl$_3$, PdCl$_2$·2H$_2$O, NiCl$_2$, TiCl$_4$, etc. can be employed. However, from the standpoint of reactivity of the hydrosilylation reaction, it is particularly preferable to use either a platinum-vinylsiloxane complex or a platinum-olefin complex. The platinum-vinylsiloxane complex is a generic term denoting any compound of platinum with a vinyl group-containing siloxane, polysiloxane or cyclosiloxane coordinated as a ligand, and as specific examples of said ligand, there can be mentioned 1,1,3,3-tetramethyl-1,3-divinyldisiloxane and 1,3,5,7-tetramethyl-1,3,5,7-tetravinylcyclotetrasiloxane, among others. The olefinic ligand of said platinum-olefin complex includes 1,5-hexadiene, 1,7-octadiene, 1,9-decadiene, 1,11-dodecadiene and 1,5-cyclooctadiene, among others. Among these ligands, 1,9-decadiene is particularly preferred.

The platinum-vinylsiloxane complexes and platinum-olefin complexes are disclosed in Japanese Kokoku Publication Hei-8-9006.

The amount of use of the catalyst is not particularly restricted but, generally speaking, the amount of the platinum catalyst is preferably $10^{-1}$ to $10^{-8}$ moles, more preferably $10^{-3}$ to $10^{-6}$ moles, per mole of the alkenyl group. If the amount of the catalyst is too small, the hydrosilylation reaction may fail to proceed sufficiently. If the amount of the catalyst is too excessive, the large catalyst consumption will be reflected in an increased production cost and increased catalyst residues in the product.

From the standpoint of promoting the hydrosilylation reaction, it is preferable to make molecular oxygen available in the reaction system for reactivation of the catalyst (Japanese Kokai Publication Hei-8-283339) and adding a sulfur compound. Addition of a sulfur compound enables reduction in production time without involving an increase in production cost due to increased requirements for the expensive platinum catalyst or the trouble of removing the residual catalyst, thus contributing to enhanced productivity. As said sulfur compound, there can be mentioned elemental sulfur, thiols, sulfides, sulfoxides, sulfones and thioketones, and elemental sulfur is particularly preferred but not an exclusive choice. For addition of a sulfur compound to a liquid reaction system, the sulfur compound may be dissolved in a portion of the reaction mixture or of the solvent to be used and, then, the solution be added to the reaction system, whereby a uniform dispersion can be obtained. For example, the sulfur compound can be dissolved in an organic solvent such as toluene, hexane or xylene and, then, added.

The addition amount of the sulfur compound can be typically selected from the range of 0.1 to 10 times the number of moles of the metal catalyst, $10^{-3}$ to $10^{-6}$ times the number of moles of the alkenyl group, or 0.001 to 10 ppm based on the total weight of the reaction mixture. If the addition amount is too low, the effect of the invention will not necessarily be attained. If the sulfur compound is added in an excessively large amount, there may at times be encountered a reduction in the catalyst activity or an inhibition in the progress of reaction. Therefore, a judicious selection of the amount of sulfur is recommended.

The hydrosilylation reaction in the production process according to the present invention can be carried out in the absence of a solvent or in the presence of a suitable solvent. As the solvent for this hydrosilylation reaction, hydrocarbons, halogenated hydrocarbons, ethers and esters can be generally used, although specifically the use of hexane, toluene, xylene, methylene chloride, tetrahydrofuran, diethyl ether or ethylene glycol dimethyl ether is preferred. Particularly in the hydrosilylation of a compound of high molecular weight, the use of a solvent is preferred for assuring dissolution or reduction in viscosity. In this connection, the plasticizer for use in the final formulation of a compound of high molecular weight can be utilized as the reaction solvent.

In the hydrosilylation reaction according to the present invention, the atmosphere within the hydrosilylation reactor may be exclusively composed of an inert gas, such as nitrogen or helium gas, or may contain oxygen. Hydrosilylation reactions are sometimes conducted in the presence of an inert gas, e.g. nitrogen or helium gas, from the standpoint of safety of inflammable gas handling. However, when a hydrosilylation reaction is carried out in an inert gas atmosphere, such as nitrogen or helium gas, the conversion rate may be low depending on the conditions of reaction used.

In the process according to the present invention, the progress of hydrosilylation reaction can be safely promoted by using oxygen at an amount capable of avoiding explosive mixture-forming concentration level. Thus, the oxygen concentration of the reactor gas phase may for example be 0.5 to 10%.

Furthermore, in order to inhibit oxidation of the polyether oligomer, reaction solvent and/or plasticizer in the hydrosilylation reaction system by the oxygen present, the hydrosilylation reaction can be conducted in the presence of an antioxidant. As said antioxidant, there can be mentioned phenolic antioxidants having a radical chain-terminating function, such as 2,6-di-tert-butyl-p-cresol, 2,6-di-tert-butylphenol, 2,4-dimethyl-6-tert-butylphenol, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis{methylene-3(3,5-di-tert-butyl-4-hydroxyphenyl)propionate}methane, and 1,1,3-tris(2-methyl-4-hydroxy-5-tert-butylphenyl)butane. As other radical chain terminators, there can be mentioned amine series antioxidants such as phenyl-β-naphthylamine, α-naphthylamine, N,N'-di-sec-butyl-p-phenylenediamine, phenothiazine, N,N'-diphenyl-p-phenylenediamine, etc. Those antioxidants are by no means exclusive choices, however.

In accordance with the process of the present invention, there can be obtained a reactive silicon group-containing polyether oligomer in which the average number of reactive silicon groups is not less than 85% of the total number of molecular chain terminals of the oligomer. By using a polyether oligomer with a silylation rate of not less than 85%, a curable composition having physical properties required of a sealant (breaking strength, elongation at break, etc.) as well as very satisfactory bond strength can be obtained.

The silylation rate may be determined by various methods. In the state of the art, accurate values can be found by NMR analysis. Thus, the silylation rate can be found by calculating the ratio of the number of molecular chain terminals into which the reactive silicon group has been introduced to the number of terminals not carrying such groups from the NMR data.

The reactive silicon group-containing polyether oligomer for use as component (A) may be a single species or a combination of two or more species.

As the silanol condensation catalyst which can be used as component (B) in the present invention, there can be various titanates such as tetrabutyl titanate, tetrapropyl titanate, etc.; tin carboxylates such as dibutyltin dilaurate, dibutyltin maleate, dibutyltin diacetate, stannous octanoate, tin naphthenate, etc.; reaction products of dibutyltin oxide with phthalic esters; dibutyltin diacetylacetonate; organoaluminum compounds such as aluminum trisacetylacetonate, aluminum trisethylacetoacetate, diisopropoxyaluminum ethylacetoacetate, etc.; chelate compounds such as zirconium tetracetylacetonate, titanium tetracetylacetonate, etc.; lead octanoate; amine compounds such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole, 1,8-diazabicyclo(5.4.0)undecene-7 (DBU), etc.; salts of such amine compounds with a carboxylic acid; low molecular polyamide resins obtainable by reacting an excess of a polyamine with polybasic acids; reaction products of an excess of a polyamine with epoxy compounds; amino-containing silane coupling agents such as γ-aminopropyltrimethoxysilane, N-(β-aminoethyl) aminopropylmethyldimethoxysilane, etc.; as well as other known silanol condensation catalysts inclusive of acidic catalysts and basic catalysts. Those catalysts can be used singly or in a combination of two or more species. Particularly preferred, among said catalysts, are tin octanoate, the reaction product of dibutyltin oxide with a phthalic ester, and dibutyltin diacetylacetonate.

The amount of use of said silanol condensation catalyst relative to 100 weight parts of the oxyalkylene polymer is preferably about 0.1 to 20 weight parts, more preferably about 1 to 10 weight parts. If the relative amount of the silanol condensation catalyst with respect to the oxypropylene polymer is too small, the curing reaction will not only be retarded but will not proceed sufficiently. On the other hand, if the ratio of the silanol condensation catalyst to the oxyalkylene polymer is too large, local generation of heat and formation of air cells will occur in curing so that no satisfactory cured product will be obtained.

The composition comprising said reactive silicon group-containing polyether oligomer and silanol condensation catalyst according to the present invention cures on exposure to moisture in the air at room temperature to yield a film of good adhesion to a metal, glass or the like substrate, thus being of value as a film-forming composition, a sealant composition, a coating composition and/or an adhesive composition for buildings, aircraft and automobiles, among other applications.

The curable composition of the present invention can be supplemented, where necessary, with various additives such as a plasticizer, filler, solvent, tackifier, dehydrating agent and so on.

The plasticizer mentioned above includes phthalic esters such as dibutyl phthalate, diheptyl phthalate, di(2-ethylhexyl) phthalate, butyl benzyl phthalate, butyl phthalylbutyl glycolate, etc., non-aromatic dibasic acid esters such as dioctyl adipate, dioctyl sebacate, etc. and phosphoric esters such as tricresyl phosphate, tributyl phosphate, etc., and, as plasticizers of relatively high molecular weight, further includes polyester plasticizers such as polyesters of dibasic acids with dihydric alcohols, polyethers such as polypropylene glycol and its derivatives, and polystyrenes such as poly-α-methylstyrene and polystyrene, to name but a few examples.

The use of a polyether is preferred for improved shelf-life and prevention of decrease in curing rate during storage.

Those plasticizers can be used alone or in admixture. The plasticizer is used in a proportion of 20 to 400 weight parts to each 100 weight parts of the reactive silicon group-containing polyether oligomer.

The filler mentioned above includes various inorganic fillers such as wood flour, walnut shell flour, rice hull flour, pulp, cotton chips, mica, graphite, diatomaceous earth, china clay, kaolin, clay, talc, silicic anhydride, quartz powder, aluminum powder, zinc powder, asbestos, glass fiber, carbon fiber, glass beads, magnesium carbonate, titanium oxide, alumina, glass balloon, silasu balloon, silica balloon, calcium oxide, magnesium oxide, silicon oxide, etc. and organic fillers such as powdered rubber, regenerated rubber, thermoplastic or thermosetting resin particles, hollow polyethylene or other articles, etc. Those fillers can be used singly or in a combination of two or more species.

From the standpoint of workability, the amount of use of the filler based on 100 weight parts of the polyether oligomer (A) is preferably about 3 to 300 weight parts, more preferably about 10 to 150 weight parts.

The solvent mentioned above includes various inert solvents such as hydrocarbons, e.g. toluene, xylene, n-hexane, cyclohexane, etc.; acetic esters such as ethyl acetate, butyl acetate, etc.; alcohols such as methanol, ethanol, isopropyl alcohol, n-butanol, etc.; ethers such as ethylcellosolve, butylcellosolve, cellosolve acetate, etc.; and ketones such as methyl ethyl ketone, ethyl acetoacetate, acetylacetone, diacetone alcohol, methyl isobutyl ketone, acetone, cyclohexanone, cyclooctanone, etc. Thus, only if it is an inert solvent, virtually any solvent can be employed.

The tackifier mentioned above is preferably an amino-containing alkoxysilane or an amino-substituted alkoxysilane derivative.

The amino-containing alkoxysilane or amino-substituted alkoxysilane derivative mentioned above includes various amino-substituted alkoxysilanes such as γ-aminopropyltrimethoxysilane, γ-aminopropyltriethoxysilane, γ-aminopropylmethyldimethoxysilane, N-(β-aminoethyl)-γ-aminopropyltrimethoxysilane, N-(β-aminoethyl)-γ-aminopropyltriethoxysilane, N-(β-aminoethyl)-β-aminopropylmethyldimethoxysilane, 1,3-diaminoisopropyltrimethoxysilane, etc. and reaction products of said amino-substituted alkoxysilanes with an epoxysilane compound such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane, or the like or with a methacryloxysilane compound such as methacryloxypropyltrimethoxysilane, methacryloxypropyltris(methoxyethoxy)silane, methacryloxypropyltriethoxysilane, methacryloxypropylmethyldimethoxysilane or the like. The reaction of an amino-substituted alkoxysilane with the epoxysilane or acryloylsilane compound mentioned above can be easily carried out by mixing each mole of the amino-substituted alkoxysilane with 0.2 to 5 moles of the latter silane compound and agitating the mixture at room temperature to 180° C. for 1 to 8 hours.

The amino-substituted alkoxysilane or amino-substituted alkoxysilane derivative mentioned above is preferably formulated in a proportion of 0.01 to 20 weight parts relative to 100 weight parts of the polyether polymer having a terminal hydrolyzable silyl functional group available for crosslinking. If the formulating amount is less than 0.01 weight part, the expected adhesion may hardly be expressed, while the use in excess of 20 weight parts will adversely affect rubber-like properties after curing.

As the dehydrating agent mentioned above, there can be mentioned a compound having a hydrolyzable group bound to a silicon atom more ready to react with $H_2O$ than with the silyl group in the reactive silicon group-containing polyether oligomer (A) and, usually, one having a molecular weight of not more than 300 is preferred.

The hydrolyzable group includes alkoxy, acyloxy, ketoximato, amino, aminooxy, amido and alkenyloxy, among others. As the substituent, epoxy-containing groups, amino-containing groups, acryl-containing groups and mercapto-containing groups can be mentioned by way of example. As specific examples of such compounds, there can be mentioned $Si(OC_2H_5)_4$, $CH_2=CHSi(OC_2H_5)_3$, $CH_2=CHSi(OCH_3)_3$, $CH_2=CHSi(OAc)_3$, $CH_3\text{-Si}[ON=C(CH_3)(C_2H_5)]_3$, $CH_3Si[N(CH_3)_2]_3$, $CH_3Si[N(CH_3)(C_2H_5)]_3$, $CH_3Si[N(CH_3)Ac]_3$, $CH_3Si[OC(C_2H_5)=CH_2]_3$, $CH_2(O)CHCH_2O(CH_2)_3Si(OCH_3)_3$, $CH_2(O)CHCH_2O(CH_2)_3Si(OCH_2CH_3)_3$, $CH_3CH_2Si(OCH_3)_3$, $CH_3CH_2Si(OCH_2CH_3)_3$, $CH_2=C(CH_3)COO(CH_2)_3Si(OCH_3)_3$, $CH_2=C(CH_3)COO(CH_2)_3Si(OCH_2CH_3)_3$, $HS(CH_2)_3Si(OCH_3)_3$, and $HS(CH_2)_3Si(OCH_2CH_3)_3$, among others.

Those dehydrating agents can be used singly or in admixture. The dehydrating agent is preferably used in a proportion of about 0.01 to 20 weight parts to each 100 weight parts of the reactive silicon group-containing polyether oligomer.

As the other additives mentioned above, anti-sagging agents such as hydrogenated castor oil, organic bentonite, calcium stearate, etc., colorants, and antioxidants such as UV absorbers, light stabilizers, etc. can be mentioned.

The method for producing the curable composition comprising components (A) and (B) according to the present invention is not particularly restricted but may be a per se known method. Thus, for example, a method which comprises formulating components (A) and (B) and kneading them by means of a mixer, roll or kneader or a method which comprises dissolving and mixing the components in a solvent can be employed. This composition can be provided in whichever desired of a one-component type and a two-component type.

In accordance with the present invention, the constitution of which has been described above, a methyl group is introduced into the neighborhood of the reactive silicon group of an oligomer to reduce the reactivity of the reactive silicon group and thereby provide a curable composition having good workability with controlled curing rate.

Best Mode for Carrying Out the Invention

The following examples illustrate the present invention in further detail, it being to be understood that the scope of the invention is by no means defined by these examples.

Example of Synthesis-1

Using a polypropylene oxide having a molecular weight of about 2000 as the initiator, the polymerization of propylene oxide was carried out in the presence of a zinc hexacyanocobaltate-glyme complex catalyst to prepare a polypropylene oxide having a number average molecular weight of about 10,000 (the terminal group molecular weight as calculated from measured terminal group concentration). To this hydroxy-terminated polyether oligomer was added 1.2 equivalents, based on the hydroxyl group, of a methanolic solution of NaOMe, and the methanol was then distilled off. To the residue was added 3-chloro-2-methyl-1-propene for conversion of terminal OH to methallyl to thereby provide a bifunctional polypropylene oxide (a1) having a methallyl group at both terminals and having a number average molecular weight of about 10,000.

Example of Synthesis-2

Using a polypropylene oxide having a molecular weight of about 2000 as the initiator, the polymerization of propylene oxide was carried out in the presence of a zinc hexacyanocobaltate-glyme complex catalyst to prepare a polypropylene oxide having a number average molecular weight of about 10,000 (the terminal group molecular weight as calculated from measured terminal group concentration). To this hydroxy-terminated polyether oligomer was added 1.2 equivalents, based on the hydroxyl group, of a methanolic solution of NaOMe, and the methanol was then distilled off. To the residue was added 3-chloro-1-propene for conversion of terminal OH to methallyl to thereby provide a bifunctional polypropylene oxide (b1) having an allyl group at both terminals and having a number average molecular weight of about 10,000.

Example of Synthesis-3

A 1 L autoclave was charged with 500 g of (a1) obtained in Example of Synthesis-1 and 10 g of hexane and the water was azeotropically removed at 90° C. Then, the hexane was distilled off under reduced pressure, followed by substitution with 8% $O_2/N_2$ gas. Then, 25 μl of sulfur (a 1 wt. % solution in toluene) and 56 μl of platinum divinyldisiloxane complex (a 3 wt. % (as Pt) solution in xylene) were added, and 24.2 g of dimethoxymethylsilane was further added dropwise. This mixture was reacted at 90° C. for 5 hours, then the unreacted dimethoxymethylsilane was distilled off under reduced pressure to give a reactive silicon group-containing polyether oligomer (a). This oligomer had a number average molecular weight of about 10,000 (the GPC polystyrene converted molecular weight converted to the terminal group-based molecular weight) and a silylation rate of 97% as determined by NMR.

Example of Synthesis-4

A 1 L autoclave was charged with 500 g of (b1) obtained in Example of Synthesis-2 and 10 g of hexane and the water was azeotropically removed at 90° C. Then, the hexane was distilled off under reduced pressure, followed by nitrogen gas purging. Then, 30 μl of platinum divinyldisiloxane complex (a 3 wt. % (as Pt) solution in xylene) was added, and 9.0 g of dimethoxymethylsilane was further added dropwise. This mixture was reacted at 90° C. for 2 hours, then the unreacted dimethoxymethylsilane was distilled off under reduced pressure to give a reactive silicon group-containing polyether oligomer (b). This oligomer had a number average molecular weight of about 10,000 (the GPC polystyrene converted molecular weight converted to the terminal group molecular weight) and a silylation rate of 77% as determined by NMR.

EXAMPLE 1

To 50 g of the reactive silicon group-containing polyether oligomer (a) were added 0.3 g of $H_2O$ and 0.2 g of the silanol condensation catalyst dibutyltin diacetylacetonate (manufactured by Nitto Kasei Co., Ltd.; product name: Neostann U-220), followed by stirring for 30 seconds and centrifugal defoaming for 1 minute. Then, the time course of viscosity was monitored with a BM viscosimeter (rotor No. 4, 6 rpm). The time to a viscosity value of 100 Pa·s is shown in Table 1.

The addition amount of the silanol condensation catalyst in Table 1 is based on 100 g of the oligomer.

EXAMPLE 2

To 50 g of the reactive silicon group-containing polyether oligomer (a) were added 0.3 g of $H_2O$, 3.0 g of the silanol condensation catalyst stannous octanoate (manufactured by Nitto Kasei Co., Ltd.; product name: Neostann U-28) and 0.5 g of laurylamine, followed by stirring for 30 seconds and centrifugal defoaming for 1 minute. Then, the time course of viscosity was monitored with a BM viscosimeter (rotor No. 4, 6 rpm). The time to a viscosity value of 100 Pa·s is shown in Table 1.

Comparative Example 1

To 50 g of the reactive silicon group-containing polyether oligomer (b) were added 0.3 g of $H_2O$ and 0.2 g of the silanol condensation catalyst dibutyltin diacetylacetonate (manufactured by Nitto Kasei Co., Ltd.; product name: Neostann U-220), followed by stirring for 30 seconds and centrifugal defoaming for 1 minute. Then, the time course of viscosity was monitored with a BM viscosimeter (rotor No.4, 6 rpm). The time to a viscosity value of 100 Pa·s is shown in Table 1.

Comparative Example 2

To 50 g of the reactive silicon group-containing polyether oligomer (b) were added 0.3 g of $H_2O$, 3.0 g of the silanol condensation catalyst stannous octanoate (manufactured by Nitto Kasei Co., Ltd.; product name: Neostann U-28) and 0.5 g of laurylamine, followed by stirring for 30 seconds and centrifugal defoaming for 1 minute. Then, the time course of viscosity was monitored with a BM viscosimeter (rotor No. 4, 6 rpm). The time to a viscosity value of 100 Pa·s is shown in Table 1.

TABLE 1

| | Oligomer | Silanol condensation catalyst Catalyst | Addition amount (parts) | Time to 100 Pa · s (min.) |
|---|---|---|---|---|
| Example 1 | A | Dibutyltin diacetylacetonate | 0.4 | 86 |
| Example 2 | | Stannous octanoate + laurylamine | 6 + 1 | 128 |
| Compar. Example 1 | B | Dibutyltin diacetylacetonate | 0.4 | 24 |
| Compar. Example 2 | | Stannous octanoate + laurylamine | 6 + 1 | 78 |

It can be seen from the foregoing results that because of the introduction of a side-chain methyl group into the neighborhood of the reactive silicon group in Example 1 and Example 2, the cure time could be well controlled. On the other hand, in Comparative Examples 1 and 2, where the reactive silicon group was bound to the oligomer main chain through a straight-chain alkyleneoxy group, the curing reaction was rapid.

What is claimed is:

1. A curable composition comprising (A) a reactive silicon group-containing polyether polymer and (B) dibutyltin diacetylacetonate as a silanol condensation catalyst, said (A) reactive silicon group-containing polyether polymer having a partial structure of the following general formula (1) per molecule:

$$—O—R^1—CH(CH_3)—CH_2—(Si(R^2{}_{2-b})(X_b)O)_m Si(R^3{}_{3-a})X_a \quad (1)$$

wherein $R^1$ represents a divalent organic group containing 1 to 20 carbon atoms and one or more constituent atoms selected from the group consisting of hydrogen, oxygen and nitrogen; $R^2$ and $R^3$ may be the same or different and each represents an alkyl group containing 1 to 20 carbon atoms, an aryl group containing 6 to 20 carbon atoms, an aralkyl group containing 7 to 20 carbon atoms or a triorganosiloxy group of the formula $(R')_3SiO—$; when 2 or more $R^2$ or $R^3$ groups are present, they may be the same or different; R' represents a monovalent hydrocarbon group containing 1 to 20 carbon atoms and three R' groups may be the same or different; X represents a hydroxyl group or a hydrolyzable group and when two or more X groups are present, they may be the same or different; a represents 0, 1, 2 or 3; b represents 0, 1 or 2; b may be the same or different over m repeats of $(Si(R^2{}_{2-b})(X_b)O)$; m represents an integer of 0 to 19: provided that the relation of $a+\Sigma b \geq 1$ is satisfied, and wherein not less than 85% of the number of molecular chain terminals have the reactive silicon groups as determined by NMR analysis in said (A) reactive silicon group-containing polyether polymer.

2. The curable composition according to claim 1 wherein $R^1$ in (A) represents $CH_2$.

3. The curable composition according to claim 1 wherein said (A) reactive silicon group-containing polyether polymer has a partial structure of the following formula:

$$—O—CH_2—CH(CH_3)—CH_2—Si(CH_3)(OCH_3)_2.$$

4. The curable composition according to claim 1 wherein said (A) reactive silicon group-containing polyether polymer is obtainable by reacting a polyether polymer containing an unsaturated bond of the following general formula (2):

$$—O—R^1—C(CH_3)=CH_2 \quad (2)$$

$R^1$ is as defined in claim 1,
with a reactive silicon group-containing compound represented by the following general formula (3):

$$H—(Si(R^2{}_{2-b})(X_b)O)_m Si(R^3{}_{3-a})X_a \quad (3)$$

$R^2$, $R^3$, a, b, m and X are as defined in claim 1, in the presence of a catalyst and a sulfur compound in an oxygen-containing atmosphere.

5. The curable composition according to claim 1 wherein said (A) reactive silicon group-containing polyether polymer has a partial structure of the following formula:

$$—O—CH_2—CH(CH_3)—CH_2—Si(CH_3)(OCH_3)_2$$

said (A) being obtainable by reacting a polyether polymer containing an unsaturated bond of the following formula:

$$—O—CH_2—C(CH_3)=CH_2$$

with a reactive silicon group-containing compound represented by the following formula:

$$H—Si(CH_3)(OCH_3)_2$$

in the presence of a catalyst and a sulfur compound in an oxygen-containing atmosphere.

6. The curable composition according to claim 4, wherein, in said (A) reactive silicon group-containing polyether polymer, not less than 85% of the number of molecular chain terminals have the reactive silicon groups.

7. The curable composition according to claim 5, wherein, in said (A) reactive silicon group-containing polyether polymer, not less than 85% of the number of molecular chain terminals have the reactive silicon groups.

8. The curable composition according to claim 1, wherein not less than 97% of the number of molecular chain terminals have the reactive silicon groups as determined by NMR analysis in said (A) reactive silicon group-containing polyether polymer.

* * * * *

UNITED STATES PATENT AND TRADEMARK OFFICE
CERTIFICATE OF CORRECTION

PATENT NO.     : 6,444,775 B1
DATED          : September 3, 2002
INVENTOR(S)    : Jyono et al.

It is certified that error appears in the above-identified patent and that said Letters Patent is hereby corrected as shown below:

Column 16,
Lines 45-57, delete claims 6 and 7.

Signed and Sealed this

Twelfth Day of August, 2003

JAMES E. ROGAN
*Director of the United States Patent and Trademark Office*